Nov. 16, 1948.    J. P. MILLER    2,453,851
THERMOSTATIC POWER ELEMENT
Filed Aug. 10, 1945
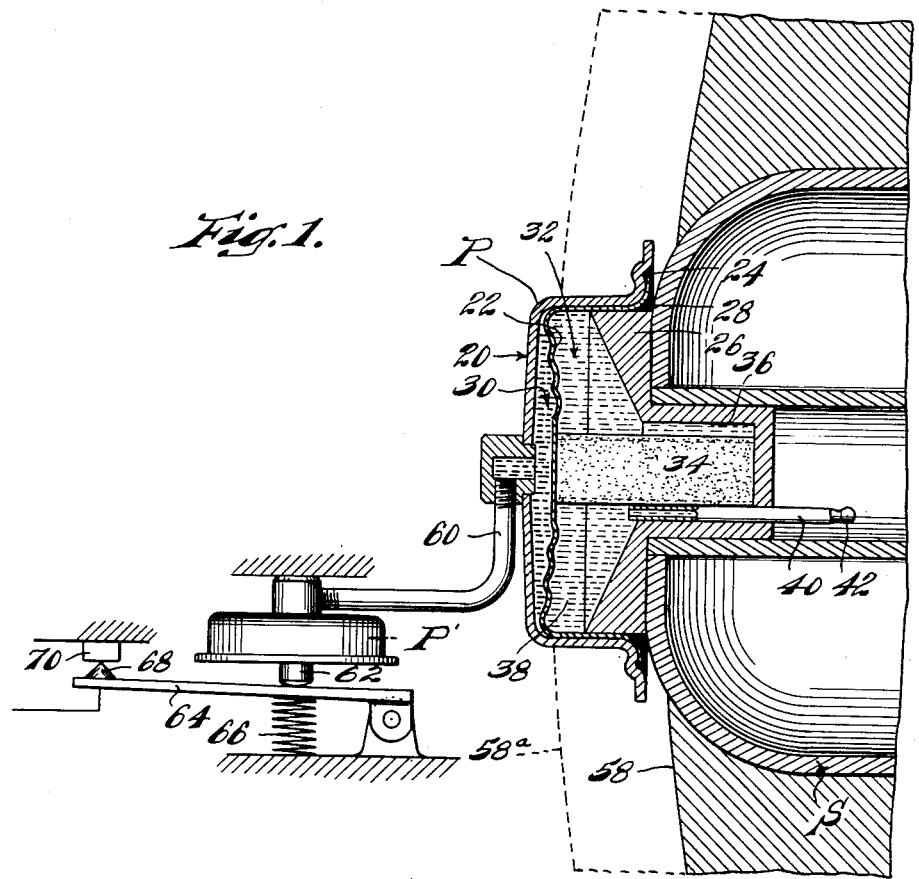
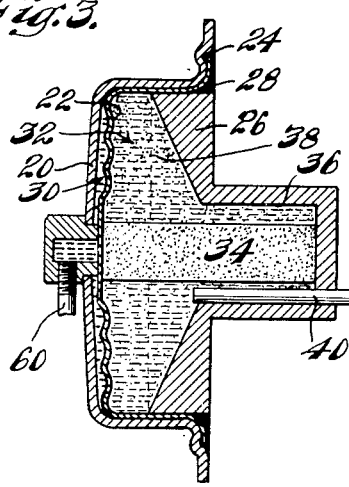
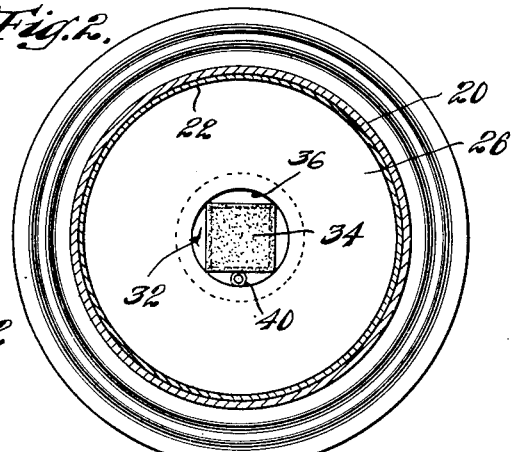
INVENTOR.
Julian P. Miller.
BY Bair & Freeman
Atty's.

Patented Nov. 16, 1948

2,453,851

UNITED STATES PATENT OFFICE 2,453,851

THERMOSTATIC POWER ELEMENT

Julian P. Miller, Goshen, Ind., assignor to Penn Electric Switch Co., Goshen, Ind., a corporation of Iowa Application August 10, 1945, Serial No. 610,151

10 Claims. (Cl. 297—3)

This invention relates to a power element of the "solid charge" type wherein a liquid transmission is utilized for transmitting motion and motion is imparted to the liquid by the expansion of water when it freezes to ice.

One object of the invention is to provide a power element comprising a housing and a diaphragm or other movable wall with a transmission liquid chamber on one side of the diaphragm and a chamber on the other side which may be filled with water or other suitable liquid, depending upon the temperature at which it is desired that the power element operate, water, of course, operating the element at substantially 32° F. and other liquids effecting operation of the power element at whatever the freezing temperature of such liquid is.

Another object is to provide a power element wherein means is provided to eliminate an erratic motion of the diaphragm as experienced with a chamber back of the diaphragm and filled with water only, the present invention utilizing a block of rubber or similar displaceable material which applies pressure on the diaphragm due to an extruding action of the rubber block caused by its diametrical compression as water freezes to ice around it, the arrangement thus keeping the diaphragm moving ahead of the freezing water instead of a stiffening action of the diaphragm occurring because of the water next to it being frozen.

With these and other objects in view, my invention consists in the construction, arrangement and combination of the various parts of my device whereby the objects contemplated are attained, as hereinafter more fully set forth, pointed out in the claims and illustrated in the accompanying drawings, wherein:

Fig. 1 is a sectional view of a power element embodying my invention and showing it diagrammatically connected with a control switch and mounted on a support of the kind shown in the copending application of Joseph P. Linfor, Serial No. 608,282, filed August 1, 1945;

Fig. 2 is a sectional view on the line 2—2 of Fig. 1; and

Fig. 3 is a sectional view similar to a portion of Fig. 1 showing the diaphragm in its outer position.

On the accompanying drawing I have used the reference character P to indicate, in general, my power element which consists of a housing 20 which may be made of brass or the like. Within the housing 20 is a cup-shaped diaphragm 22, the peripheral edge of the diaphragm being sealed relative to the housing 20 as by solder at 24. Within the diaphragm 22 is a back wall 26 which may also be sealed relative to the housing 20 and the diaphragm 22 by solder, indicated at 28. The parts, when assembled, as just described, provide two chambers 30 and 32. The chamber 32 is provided for a movement transmission liquid, which liquid communicates with a capillary tube 60 extending to a second power element P'. The power element P' is of the housing and diaphragm type, similar to the power element P, and has an extensible stem 62 for moving a switch arm 64 against the action of a spring 66. The switch arm carries a movable contact 68 for circuit closing cooperation with a stationary contact 70. Instead of the switch just described, any type of control device, of course, may be controlled by the power element P.

Back of the diaphragm 22, that is, within the chamber 32, I provide water or other freezable liquid, indicated at 38. Within the chamber 32 a block 34 of displaceable material, such as rubber, is mounted. The water 38 then entirely fills the chamber 32, surrounding the block 34 with the exception of its ends which contact the diaphragm 22 and the end wall of a tubular extension 36 from the back wall 26 of the power element. This water may be introduced through a tube 40 after the parts are assembled. After the water fill has been introduced, the outer end of the tube 40 may be pinched off and sealed with solder, as indicated at 42.

Heretofore, control devices have been patented wherein a freezable liquid constitutes the actuating medium for a diaphragm or the like. For instance, the Wood patent, No. 2,187,258, shows such an arrangement. Controls of this character, however, are subject to erratic action because the water next to the diaphragm stiffens the action of the diaphragm and causes jerky motion which is undesirable.

I have overcome the shortcomings of the prior art by the use of the block 34 of displaceable material which, upon the water freezing, is compressed diametrically, as shown by dotted lines in Figs. 1 and 2. This causes elongation or linear expansion of the block 34, as from the position of Fig. 1 to the position of Fig. 3. The block, therefore, pressing at the center of the diaphragm 22, moves it for displacing the transmission liquid in the chamber 30, thereby extending the pin 62 for operating the switch arm 64. With such an arrangement the diaphragm is moved ahead of the freezing water 38 which, in Fig. 3, is indicated as ice by stipling in addition to the water indicating lines, and there is no chance for the water to stiffen the action of the diaphragm. I have found that the resulting movement of the diaphragm is smooth, as desired, and not at all erratic.

A power element of the character disclosed is particularly adaptable for controlling ice banks, as described in the copending application above referred to. In Fig. 1 a support S is shown for the power element P, and the ice bank at 58 illustrates the build-up of ice around the support. When the ice builds out, as to the dotted position indicated at 68°, it is in contact with the housing 20 for freezing the water 38 into ice and causing the power element to effect control operation at the freezing point of the liquid 38. That point is 32° F. if the liquid is water, whereas other liquids may be selected for other control points. The control point is thus quite definitely limited, and there is considerable movement in the power element P' at the control point, whereas both above and below that point there is very little movement due to mere change in temperature of the water or the ice, as the case may be. This, of course, is a desirable situation, inasmuch as certain installations, such as ice bank controls, require for greatest efficiency that the control device be operated when the ice bank reaches a certain point. Likewise, in the control of frost on an evaporator it is desirable to effect a defrosting operation when the frost builds out to a certain thickness. By having the ice or frost contact the housing 20, and thereby effect freezing of the liquid 38, the control function is performed soon after contact of the ice or frost with the housing occurs.

Some changes may be made in the construction and arrangement of the parts of my device without departing from the real purpose and spirit of my invention, and it is my intention to cover by my claims any modified forms of structure or use of mechanical equivalents which may be reasonably included within their scope.

I claim as my invention:

1. In a power element, a housing having opposed stationary and movable walls, a control device operable in response to movement of said movable wall, a freezable liquid in said housing, and means for effecting movement of said movable wall in response to freezing of the liquid comprising a displaceable element in said housing having its ends contacting said walls, said element being capable of diametric contraction due to the freezing of the liquid around its diameter, said displaceable element thereby expanding linearly to effect movement of said movable wall ahead of the freezing liquid behind it.

2. In a power element, a housing having a stationary wall, a movable wall, and means for moving said wall comprising a freezable liquid and a displaceable element in said housing, said displaceable element having endwise engagement with said stationary and movable walls and being capable of diametric contraction and linear expansion due to the freezing of said liquid around that portion of said element that does not engage said walls to thereby effect movement of said movable wall.

3. In a power element, a housing having a movable wall, a control device operable in response to movement of said wall, a freezable liquid in said housing, and means for effecting movement of said movable wall in response to freezing of the liquid comprising a displaceable element in said housing and surrounded by said liquid with the exception of its ends which are in contact with said movable wall and opposed stationary part of said housing.

4. In a power element of the character disclosed, a housing, a chamber therein, a diaphragm forming one wall of said chamber, a displaceable element in said chamber between said diaphragm and the portion of said housing opposite said diaphragm, and freezable liquid in said chamber surrounding said displaceable element except where it contacts said diaphragm and said opposite portion of said housing.

5. In a power element, a housing, a chamber therein, a diaphragm forming one wall of said chamber, and a displaceable element and freezable liquid filling said chamber, said displaceable element extending from a stationary wall of said housing to said diaphragm and said liquid surrounding said element with the exception of the ends thereof in contact with said wall and said diaphragm.

6. A power element comprising a housing, a chamber therein, an actuating diaphragm forming one wall of said chamber, an elongated displaceable element in said chamber and interposed lengthwise between said diaphragm and one wall of said housing and spanning the entire distance between them, and freezable liquid in said chamber and diametrically surrounding said displaceable element.

7. In a power element, a housing, a diaphragm therein for separating said housing into a transmission liquid chamber and a freezable liquid chamber, said transmission liquid chamber being connected with a control device, freezable liquid in said freezable liquid chamber, and a displaceable element also in said freezable liquid chamber and contacting said diaphragm and an opposed stationary part of said housing to move the same upon the liquid therein freezing around said element.

8. In a power element, a housing, a diaphragm therein for separating said housing into a transmission liquid chamber and a liquid chamber, freezable liquid in said liquid chamber, and a displaceable element of rubber-like material also therein and spanning the distance between a stationary part of said housing and said diaphragm.

9. In a power element, a housing including a diaphragm, a freezable liquid chamber in said housing, an elongated rubber block in said housing and arranged for endwise engagement with the center of said diaphragm and an opposed stationary part of said housing, and a freezable liquid in said chamber surrounding said block with the exception of its ends.

10. In a power element, a housing including an actuating diaphragm as one wall thereof, a freezable liquid chamber in said housing and enclosed by said diaphragm, a displaceable element in said housing and arranged for thrust engagement with said diaphragm and an opposed stationary element, and a freezable liquid in said chamber surrounding said displaceable element with the exception of the portions thereof in thrust engagement with said diaphragm and said element.

JULIAN P. MILLER.

REFERENCES CITED

The following references are of record in the file of this patent:

UNITED STATES PATENTS

| Number | Name | Date |
| --- | --- | --- |
| 1,719,851 | Raney | July 9, 1929 |
| 1,768,600 | Hull | July 1, 1930 |
| 2,208,149 | Vernet | July 16, 1940 |
| 2,221,347 | Giesler | Nov. 12, 1940 |
| 2,368,181 | Vernet | Jan. 30, 1945 |